US 7,047,131 B2

(12) United States Patent
Yoon et al.

(10) Patent No.: US 7,047,131 B2
(45) Date of Patent: May 16, 2006

(54) APPARATUS AND METHOD FOR DISPLAYING DETAILED MAP OF SELECTED AREA

(75) Inventors: Ho-seok Yoon, Seoul (KR); Hyo-sik Bang, Seongnam-si (KR); Sang-man Lee, Osan-si (KR); Eun-young Choi, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 379 days.

(21) Appl. No.: 10/606,269

(22) Filed: Jun. 26, 2003

(65) Prior Publication Data

US 2005/0021560 A1   Jan. 27, 2005

(30) Foreign Application Priority Data

Jun. 27, 2002   (KR)   ...................... 10-2002-0036311

(51) Int. Cl.
*G01C 21/32* (2006.01)
(52) U.S. Cl. ............ 701/212; 340/995.12; 340/995.15; 340/995.16; 345/156; 345/660; 382/298
(58) Field of Classification Search ................ 701/208, 701/212, 207, 201, 206; 340/995.12, 995.15, 340/990, 995.16, 989; 345/428, 660, 156, 345/157, 204, 173; 382/232, 276, 279, 298, 382/278, 282; 342/450
See application file for complete search history.

(56) References Cited

U.S. PATENT DOCUMENTS 6,573,842 B1 * 6/2003 Mochizuki et al. ......... 340/990
6,748,383 B1   6/2004 Wada et al.
2002/0123841 A1* 9/2002 Satoh et al. ................ 701/208
2004/0204849 A1* 10/2004 Shipley et al. ............. 701/212

FOREIGN PATENT DOCUMENTS

| CN | 1303059 A | 7/2001 |
|---|---|---|
| JP | 9-134368 A | 5/1997 |
| JP | 9-185320 | 7/1997 |
| JP | 10-40055 A | 2/1998 |
| JP | 2001-12957 A | 1/2001 |
| JP | 2001-66985 A | 3/2001 |
| KR | 1999-006550 A | 1/1999 |

OTHER PUBLICATIONS

Cui-li Sun et al., "The Method of Showing BITMAP in Different Scales of Splitter Windows" Jun. 2001.

* cited by examiner

*Primary Examiner*—Jack Keith
*Assistant Examiner*—Tuan C To
(74) *Attorney, Agent, or Firm*—Sughrue Mion, PLLC

(57) ABSTRACT

An apparatus and method for displaying a detailed map of a selected area of a displayed map received through a network are provided. If a detailed map of a particular area is requested by a user, data on the detailed map for the particular area is provided by a map provider server through a network and combined with data on the original map. A map including maps drawn to two different scales is displayed on a display device, i.e., the original map is continuously displayed while only the particular area is replaced by the detailed map. Therefore, the readability of the map is improved, and desired geographical information can be easily obtained.

14 Claims, 4 Drawing Sheets

SCALE OF 1:9,000

SCALE OF 1:9,000

APPARATUS AND METHOD FOR DISPLAYING DETAILED MAP OF SELECTED AREA

BACKGROUND OF THE INVENTION

This application claims the priority of Korean Patent Application No. 2002-36311, filed on Jun. 27, 2002, in the Korean Intellectual Property Office, the disclosure of which is incorporated herein in its entirety by reference.

1. Field of the Invention

The present invention relates to electronic maps provided through a network, and more particularly, to an apparatus and method for displaying a detailed map of a selected area of a displayed map.

2. Description of the Related Art

A related art map provider service in an Internet-based web scheme provides a detailed map of a selected area of a map displayed on a map display device, such as a display device of a computer or a personal digital assistant (PDA). When an area desired to be displayed through a detailed map is requested using an input means, such as a mouse in the case of a computer or a stylus pen in the case of a PDA, a map provider server transmits data of a low scale map of the desired area to the user. Thus, an enlarged and detailed map of the desired area is displayed.

The related art map provider server stores map data using a layer structure. If the map provider server stores data on maps drawn to various scales for an area, each layer denotes data on a map drawn to a predetermined scale. When a map drawn to a high scale is viewed at a low scale, the geographical information displayed on a screen becomes very detailed, and the map can be hardly distinguished. To solve this related art problem, various map data to different scales are made to constitute such a layer structure. Accordingly, a map drawn to a high scale shows a large area, but does not provide detailed geographical information, and a map drawn to a low scale provides geographic information, but only for a small area.

FIG. 1 shows an example of a detailed map displayed according to a related art technique. A user requests a detailed map of a dotted rectangular area on a map on the left, which is drawn to a scale of 1:9000. The map on the right corresponds to the detailed map for the dotted area on the map on the left, and is drawn to a scale of 1:3000.

As shown in FIG. 1, in a related art map provider service through a network, if a detailed map of a certain area is requested, a map to a low scale of the area is displayed over the entire screen while the previous high scale map disappears. Accordingly, only a small area is shown on the entire screen, making it hard to discover where the displayed small area is located with respect to the entire (i.e., larger) area. To ascertain the location of a particular area with respect to the entire area, some users might require the original map and the detailed map to be visualized several times, which is not provided in the related art.

SUMMARY OF THE INVENTION

Accordingly, the invention provides an apparatus for displaying a detailed map of a selected part of a displayed map at the same location of the selected part on the original map, when a map provider service is available through a network.

The present invention also provides a method of displaying a detailed map of a selected part of a displayed map at the same location of the partial area on the original map, when a map provider service is available through a network.

According to an aspect of the present invention, there is provided a map displaying apparatus that receives scalable map data from a map data provider for a user, that includes a memory that receives data from the map data provider based on a map drawn to a first scale, and stores the received data as first data and an input unit that generates an area selection signal to select an area on the first scale map in response to an input of the user. The apparatus also includes an area selection unit that selects the area in response to the area selection signal, and outputs a transmission request signal for second data that corresponds to data on a map drawn to a second scale for the selected area, a network interface unit that transmits the transmission request signal to the map data provider and receives the second data from the map data provider, and an analysis unit that receives the second data from the network interface unit, analyzes the second data, and converts the second data into third data configured for display on an output device. Further, the apparatus includes an adjusting unit that sets a size of the third data equal to a size of the selected area to obtain fourth data, and a combination unit that combines the fourth data with the selected area associated with the first data.

Additionally a map displaying method in which scalable map data is received through a network from a map data provider for a user is provided, and includes the steps of (a) receiving data that is based on a map drawn to a first scale from the map data provider, and storing the received data as first data, (b) generating an area selection signal indicative of an area on the first scale map, and (c) selecting the area associated with the area selection signal. The method also includes the steps of (d) requesting that the map data provider transmit second data that corresponds to data on a map drawn to a second scale for the selected area, (e) receiving the second data from the map data provider, and (f) analyzing the second data and converting the second data into third data that can be displayed on an output device. Further, the method includes the steps of (g) setting a size of the third data equal to a size of the selected area to obtain fourth data, and (h) combining the fourth data with the selected area associated with the first data to generate an output that can be displayed on the output device. Those steps can also be implemented as instructions for a computer readable recording medium that stores a program having instructions for executing a map displaying method, in which scalable map data is received through a network from a map data provider for a user.

The features and advantages of the present invention will become evident through the detailed description of preferred embodiments based on the accompanying drawings. Terms or words used in this specification and claims must be interpreted as meanings and notions that confirm to the technical spirit of the present invention, based on the principle that an inventor(s) may appropriately define the notions of terms in order to explain their inventions in the best way.

BRIEF DESCRIPTION OF THE DRAWINGS

The above features and advantages of the present invention will become more apparent by describing in detail exemplary embodiments thereof with reference to the attached drawings in which.

DETAILED DESCRIPTION OF THE INVENTION

An apparatus according to exemplary, non-limiting embodiment of the present invention receives map data through a network from a map data provider (for example, but not by way of limitation, a map provider server, which may be networked) that stores a large number of map data to various scales and provides the received map data to users through a display device. The apparatus for displaying a detailed map of a selected area can be a PC (e.g., wireline and/or non-compact) or a PDA (e.g., wireless and/or compact) which can be connected to a network, such as the Internet. Either a wired network or a wireless network can be used.

Figure 1:
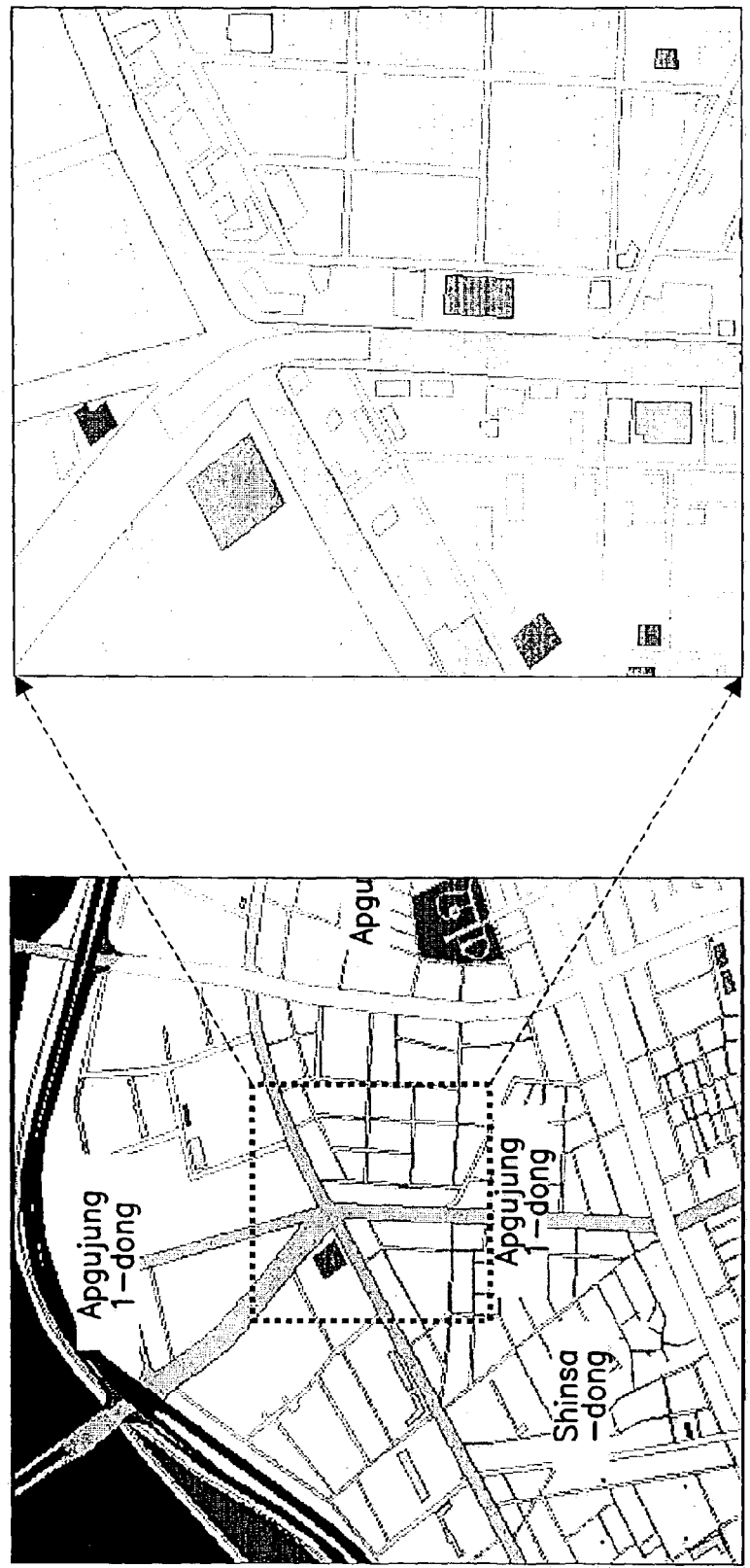
FIG. 1 shows an example of a detailed map displayed according to a related art technique.
Figure 2:
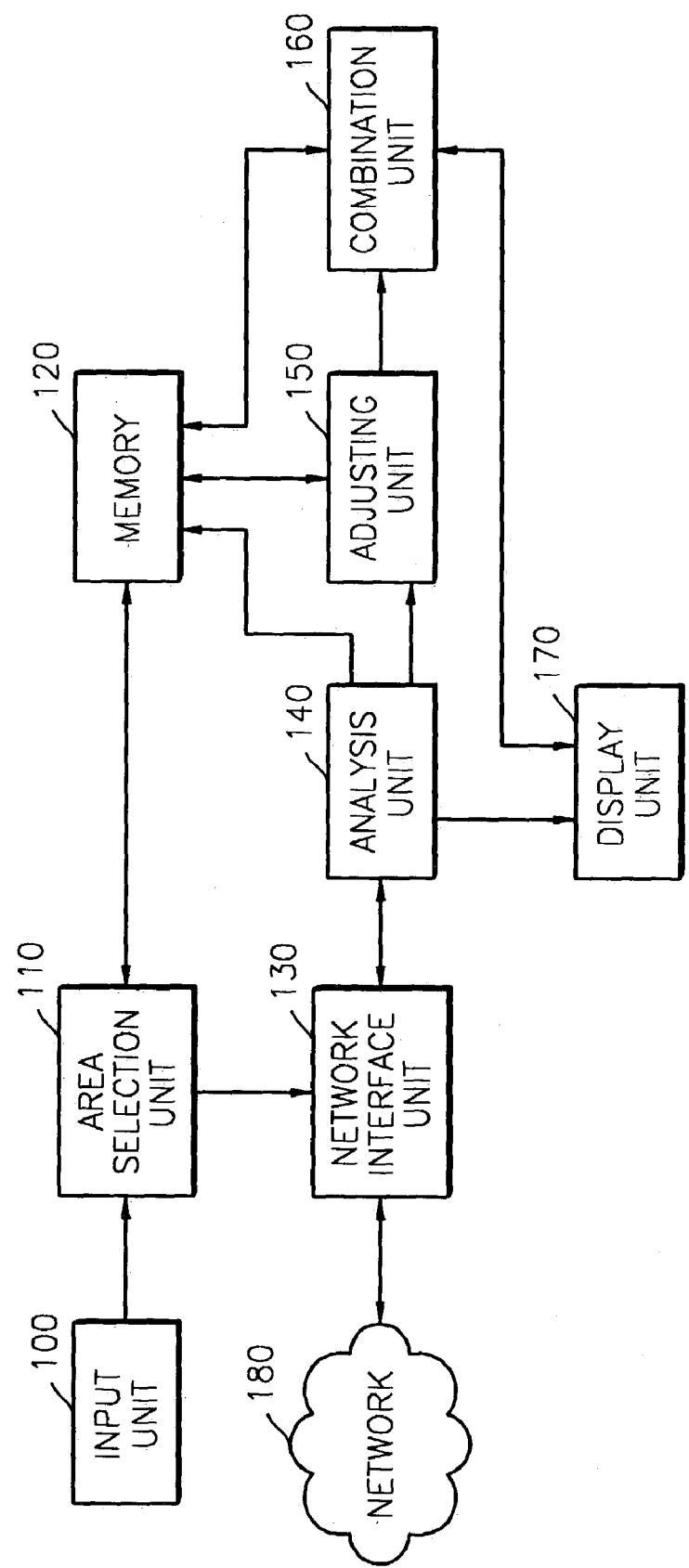
FIG. 2 is a block diagram of an apparatus according to an exemplary, non-limiting embodiment of the present invention for displaying a detailed map of a selected area.

Referring to FIG. 2, the apparatus according to the present invention includes an input unit 100, an area selection unit 110, a memory 120, a network interface unit 130 that interfaces with a network 180 (e.g., map data provider), an analysis unit 140, an adjusting unit 150, a combination unit 160, and a display unit 170.

The memory 120 stores data on a map drawn to a first scale (hereinafter, referred to as first data) previously received from a map provider server (not shown).

Using the input unit 100, a user selects a particular area to be shown to a scale other than the first scale on the first scale map, which is displayed on the display unit 170. If the apparatus is a computer, the input unit 100 can be a mouse, but is not limited thereto. If the apparatus is a PDA, the input unit 100 can be a stylus pen, but is not limited thereto. The particular area for which a detailed map is requested can be selected by a user by dragging the mouse, or using a stylus pen by touching a point corresponding to the center of the particular area. However, other methods as would be understood by those skilled in the art may also be applied.

The area selection unit 110 receives from the input unit 100 an area selection signal that represents the selected area in a screen coordinate system. The area selection unit 110 transforms the area selection signal into a longitude and latitude coordinate system by referring to the first data stored in the memory 120, and outputs a signal that requests transmission of data to a second scale map for the selected area (hereinafter, referred to as second data).

If the second scale is lower than the first scale, the second scale displays a detailed map of the selected area. On the other hand, if the second scale is higher than the first scale, the second scale displays a map on which rough geographical features of the selected area can be easily seen. For example, but not by way of limitation, if a point on a map displayed on a display device is selected using a stylus pen, the area selection unit 110 can select an area within a predetermined range around the selected point. For example, a 3 cm×3 cm area with respect to the selected point can be selected by the area selection unit 110.

The network interface unit 130 performs an interface function between a map provider server in the network 180 and a map display device. That is to say, the network interface unit 130 receives the signal requesting the second data to be transmitted from the area selection unit 110, transmits the signal to the map provider server in the network 180, and receives data including the second data from the map provider server in the network 180.

The analysis unit 140 receives the data including the second data from the network interface unit 130 and analyzes the received data to check whether the data is effective, whether the data presents errors, or the like. If errors are detected, the analysis unit 140 requests the map provider server to re-transmit complete data for the error-detected data. After the data analysis, the analysis unit 140 converts the second data into data with a format for displaying the second data on an output device such as a screen, and outputs the converted data (hereinafter, referred to as third data) to the adjusting unit 150 and the memory 120.

The adjusting unit 150 adjusts the third data with reference to the first data stored in the memory 120 and information on the location and size of the selected area to obtain data having a size equal to the size of the selected area (hereinafter, referred to as fourth data). Since map data provided by the map provider server is vector map data, the adjusting unit 150 can adjust the scale of the provided map data.

The combination unit 160 combines the fourth data received from the adjusting unit 150 with the selected area associated with the first data and outputs the resultant data to the display unit 170. A map of the selected area is drawn to a scale different than the scale of the surroundings and is provided to a user through the display unit 170. While the original map drawn to the first scale is continuously displayed on a screen without changing the map size, only the selected area is replaced by the second scale map. Accordingly, a combined map including two different scale maps is displayed.

Figure 4:
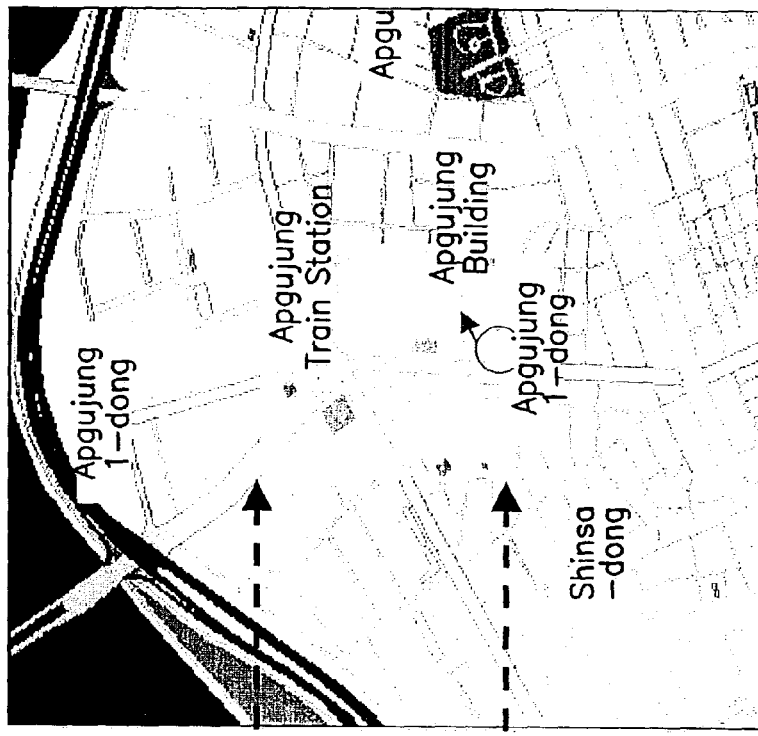
FIG. 4 shows an example of a detailed map of a selected area displayed on a display device using an apparatus for displaying a detailed map of a selected area according to exemplary, non-limiting embodiment of the present invention.
Figure 4:
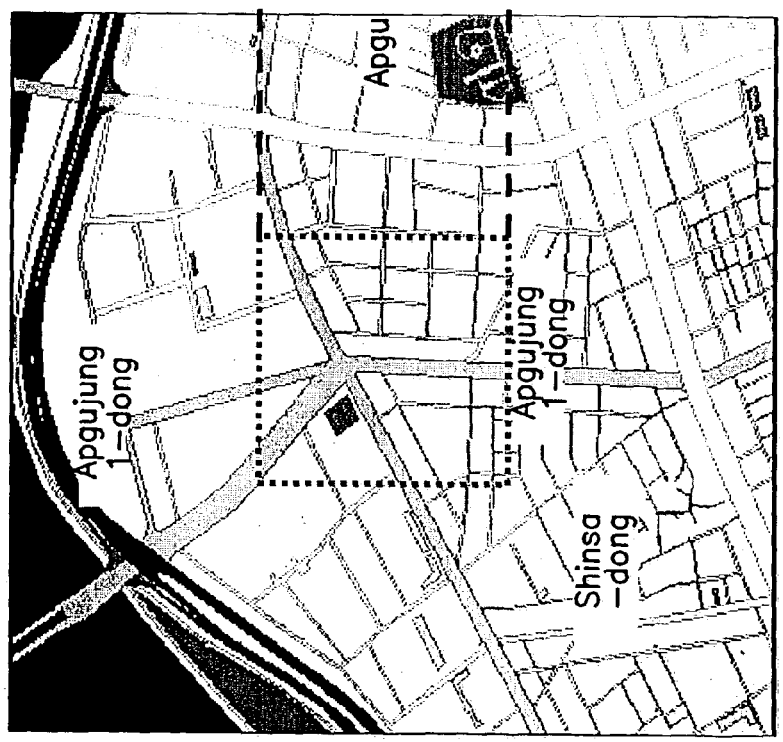

FIG. 4 shows an example of a detailed map of a selected area displayed on a display device using an apparatus according to an exemplary, non-limiting embodiment of the present invention. The map on the left is drawn to a scale of 1:9000, which is a first scale, and corresponds to a map initially displayed on the display device. A dotted area indicates an area selected by a user to be displayed in a detailed map. The map on the right is obtained in such a way that a detailed map of the selected area, which is drawn to a second scale of 1:3000, is transmitted from a map provider server and combined with the first scale map having a scale of 1:9,000. Hence, the original map is maintained the same except that the selected area is replaced by a detailed map.

Figure 3:
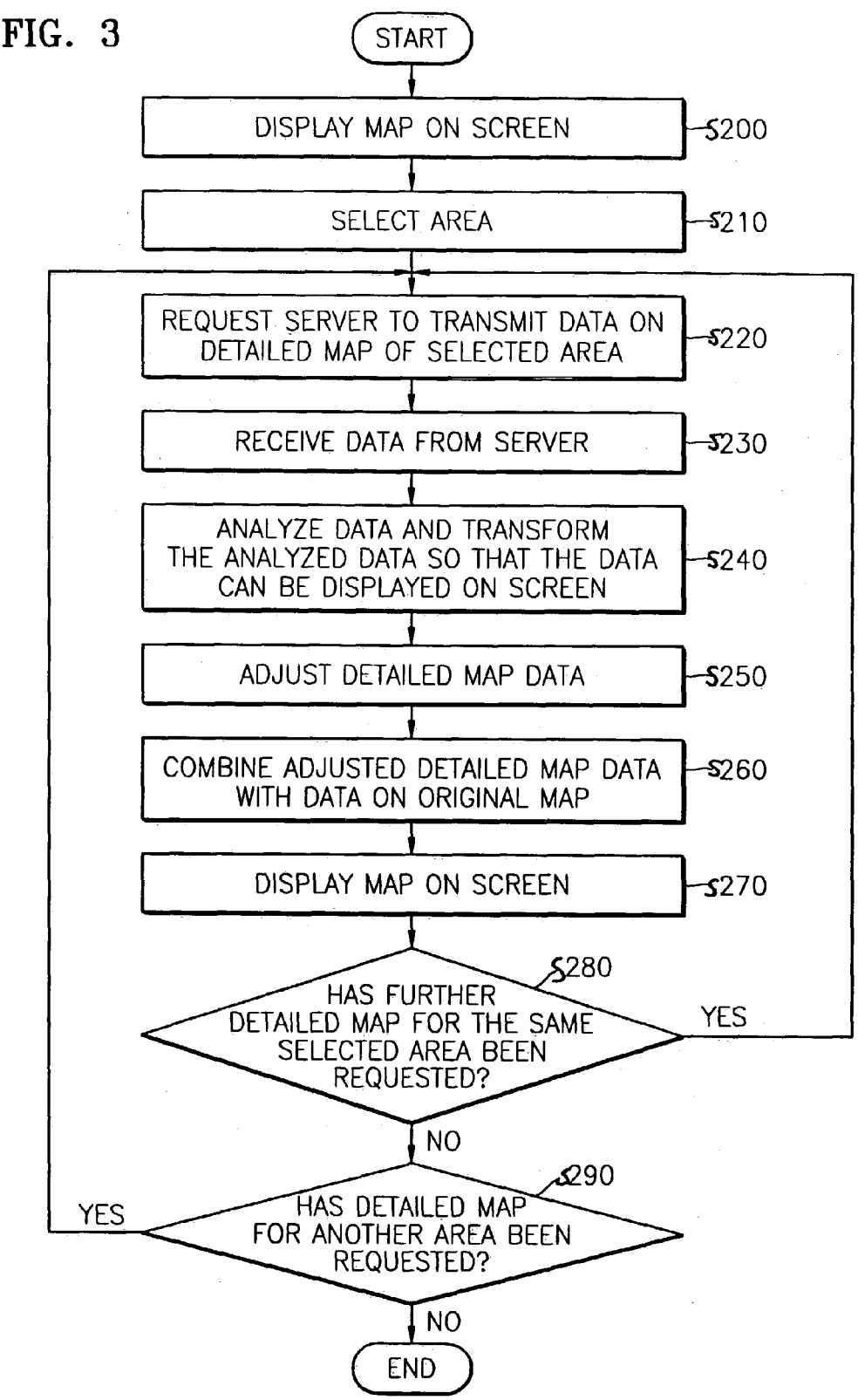
FIG. 3 is a flowchart illustrating a method according to exemplary, non-limiting embodiment of the present invention of displaying a detailed map of a selected area.

FIG. 3 is a flowchart illustrating a method for displaying a detailed map of a selected area according to an exemplary, non-limiting embodiment of the present invention. Referring to FIGS. 2 and 3, in step S200, the first scale map received in advance from the map provider server in the network 180 is displayed on the screen of the display device 170. In step S210, using the input unit 100, a user selects an area whose detailed map, which is drawn to the second scale, is to be displayed.

In step S220, through the network interface unit 130, the area selection unit 110 requests the map provider server to transmit data on the second scale map of the selected area. In step S230, the network interface unit 130 receives data including (but not limited to) the second scale map data from the map provider server.

In step S240, the analysis unit 140 analyses the received data to check whether the data is effective, presents errors, or the like, and transforms the analysed data into data that can be displayed on a display device.

In step S250, the adjusting unit 150 adjusts the size of the second scale map data received from the analysis unit 140 in order to obtain second scale map data having a size equal to the size of the screen area.

In step S260, the combination unit 160 combines the adjusted second scale map data received from the adjusting unit 150 with the first scale map of the selected area. In step S270, the display unit 170 receives the combined map data from the combination unit 160 and outputs a combined map.

In step S280, it is determined whether a user has requested a map drawn to another scale for the same selected area. If the user has requested another scale map, the method returns to step S220, and steps S220 through S280 are repeated.

On the other hand, if the user has not requested another scale map, it is determined in step S290 whether a detailed map of another area has been requested. If a detailed map of another area has been requested, the method goes back to step S220, and steps S220 through S280 are repeated.

The invention can be embodied as computer readable instructions on a computer readable recording medium. The computer readable recording medium is any data storage device that can store data, which can be thereafter read by a computer system. Examples of the computer readable recording medium include read-only memory (ROM), random-access memory (RAM), CD-ROMs, magnetic tapes, floppy disks, optical data storage devices, and so on. Also, the computer readable codes can be transmitted via a carrier wave such as the Internet. The computer readable recording medium can also be distributed over a network coupled computer systems so that the computer readable code is stored and executed in a distributed fashion. However, the present invention is not limited thereto.

As described above, in an apparatus and method for displaying a detailed map of a selected area according to the present invention, data on a detailed map of an area selected by a user is provided by a map provider server and combined with data on the original map. A map including maps drawn on two different scales is displayed. That is to say, while the surroundings other than the selected area are continuously displayed without change, the selected area is replaced by the detailed map.

The present invention has various advantages. For example, but not by way of limitation, a user can observe both the detailed map of the selected area and the map of the surroundings of the selected area.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A map displaying apparatus that receives scalable map data from a map data provider for a user, the apparatus comprising an output device for displaying a map:
   a memory that receives data from the map data provider based on a map drawn to a first scale, and stores the received data as first data;
   an input unit that generates an area selection signal to select an area on the first scale map in response to an input of the user;
   an area selection unit that selects the area in response to the area selection signal, and outputs a transmission request signal for second data that corresponds to data on a map drawn to a second scale for the selected area;
   a network interface unit that transmits the transmission request signal to the map data provider and receives the second data from the map data provider;
   an analysis unit that receives the second data from the network interface unit, analyzes the second data, and converts the second data into third data configured for display on said output device;
   an adjusting unit that sets a size of the third data equal to a size of the selected area to obtain fourth data; and
   a combination unit that combines the fourth data with the selected area associated with the first data.

2. The apparatus of claim 1, wherein the user specifies the area to be selected by operating the input unit to generate the area selection signal.

3. The apparatus of claim 1, wherein when the user selects a point on the map using the input unit, the area selection unit selects a predetermined area based on the selected point.

4. The apparatus of claim 1, wherein the second scale is lower than the first scale.

5. The apparatus of claim 1, wherein said map data provider is a networked server.

6. The apparatus of claim 1, wherein said output device is a screen.

7. The apparatus of claim 1, wherein said user input is received from one of a wireline and wireless processor.

8. The apparatus of claim 7, wherein said wireline processor is a personal computer, and said wireless processor is a personal digital assistant.

9. The method of claim 1, wherein said user input is received from one of a wireline and wireless processor, said wireline processor is a personal computer, and said wireless processor is a personal digital assistant.

10. A map displaying method in which scalable map data is received through a network from a map data provider for a user, the method comprising:
   (a) receiving data that is based on a map drawn to a first scale from the map data provider, and storing the received data as first data;
   (b) generating an area selection signal indicative of an area on the first scale map;
   (c) selecting the area associated with the area selection signal;
   (d) requesting that the map data provider transmit second data that corresponds to data on a map drawn to a second scale for the selected area;
   (e) receiving the second data from the map data provider;
   (f) analyzing the second data and converting the second data into third data that can be displayed on an output device;
   (g) setting a size of the third data equal to a size of the selected area to obtain fourth data; and
   (h) combining the fourth data with the selected area associated with the first data to generate an output that can be displayed on the output device.

11. The method of claim 10, wherein in step (b), the user specifies an area by operating the input unit to generate the area selection signal.

12. The method of claim 10, wherein when the user selects a point on the map using the input unit in step (b), a predetermined area based on the selected point is selected in step (c).

13. The method of claim 10, wherein the second scale is lower than the first scale.

14. The method of claim 10, wherein said map data provider is a networked server.

* * * * *